US012671497B2

(12) United States Patent
Grube et al.

(10) Patent No.: US 12,671,497 B2
(45) Date of Patent: Jun. 30, 2026

(54) SELF-FORMING COMMUNICATION AND CONTROL SYSTEM

(71) Applicant: The Safety Network Partnership, LLC, Barrington, IL (US)

(72) Inventors: Gary W. Grube, Barrington Hills, IL (US); Nathan L. Greiner, Hanover, IL (US); Christopher J. Kuehl, North Barrington, IL (US)

(73) Assignee: The Safety Network Partnership, LLC, Barrington, IL (US)

( * ) Notice: Subject to any disclaimer, the term of this patent is extended or adjusted under 35 U.S.C. 154(b) by 74 days.

(21) Appl. No.: 18/926,377

(22) Filed: Oct. 25, 2024

(65) Prior Publication Data

US 2026/0101425 A1 Apr. 9, 2026

Related U.S. Application Data

(60) Provisional application No. 63/626,222, filed on Jan. 29, 2024.

(51) Int. Cl.

| | |
|---|---|
| ***H05B 47/10*** | (2020.01) |
| ***H05B 47/17*** | (2020.01) |
| ***H05B 47/175*** | (2020.01) |

(52) U.S. Cl.
CPC ........... *H05B 47/17* (2020.01); *H05B 47/196* (2024.01)

(58) Field of Classification Search
CPC ........ H05B 45/30; H05B 47/10; H05B 47/17; H05B 47/196; H04W 64/00
See application file for complete search history.

(56) References Cited

U.S. PATENT DOCUMENTS

| | | | |
|---|---|---|---|
| 10,915,096 | B2 | 2/2021 | Liu |
| 11,880,250 | B2 | 1/2024 | Engelberg |
| 11,880,676 | B1 | 1/2024 | Sandler |
| 11,881,713 | B1 | 1/2024 | Johnson |
| 11,899,527 | B2 | 2/2024 | Lin |
| 11,906,955 | B2 | 2/2024 | Ponnada |
| 11,909,875 | B2 | 2/2024 | Hwang |

FOREIGN PATENT DOCUMENTS

| | | | |
|---|---|---|---|
| CN | 101184353 B | * | 5/2011 |

* cited by examiner

*Primary Examiner* — Jimmy T Vu
(74) *Attorney, Agent, or Firm* — Gary W. Grube

(57) ABSTRACT

A method for execution by a computer includes storing object monitor information for a set of detected lighting objects within a digital twin memory by applying processor-executable instructions. The method further includes interpreting a portion of the object monitor information to produce should-be configuration information for the set of detected lighting objects that includes recommended spatial placement information of at least some of the set of detected lighting objects to facilitate achievement of an environment lighting requirement by controlling the detected lighting objects.

9 Claims, 11 Drawing Sheets

SELF-FORMING COMMUNICATION AND CONTROL SYSTEM

CROSS-REFERENCE TO RELATED APPLICATIONS

The present U.S. Utility Patent Application claims priority pursuant to 35 U.S.C. § 119(e) to U.S. Provisional Application No. 63/626,222, entitled "SELF-FORMING COMMUNICATION AND CONTROL SYSTEM", filed Jan. 29, 2024, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and more particularly to computer systems associated with digital twin solutions.

Description of Related Art

Computer systems communicate data, process data, and/or store data. Such computer systems include computing devices that range from wireless smart phones, wireless mesh nodes, programmable logic controllers (PLC), various lighting and equipment controllers, laptops, tablets, personal computers (PC), work stations, personal three-dimensional (3-D) content viewers, and video game devices, to data centers where data servers store and provide access to digital content. Some digital content is utilized to represent various aspects of real-world objects in a format commonly referred to as a digital twin.

A variety of digital twin computing systems utilize digital mapping and monitoring techniques. For example, a floor plan of a distribution center is utilized to build a digital representation. As another example, a series of wirelessly meshed sensor and control nodes are deployed in the distribution center to monitor on-going distribution operations and to control aspects of the operation to affect certain desired outcomes, e.g., energy efficiency, speed of product flow, and production waste levels.

BRIEF DESCRIPTION OF THE SEVERAL VIEWS OF THE DRAWING(S)

Figure 6A:
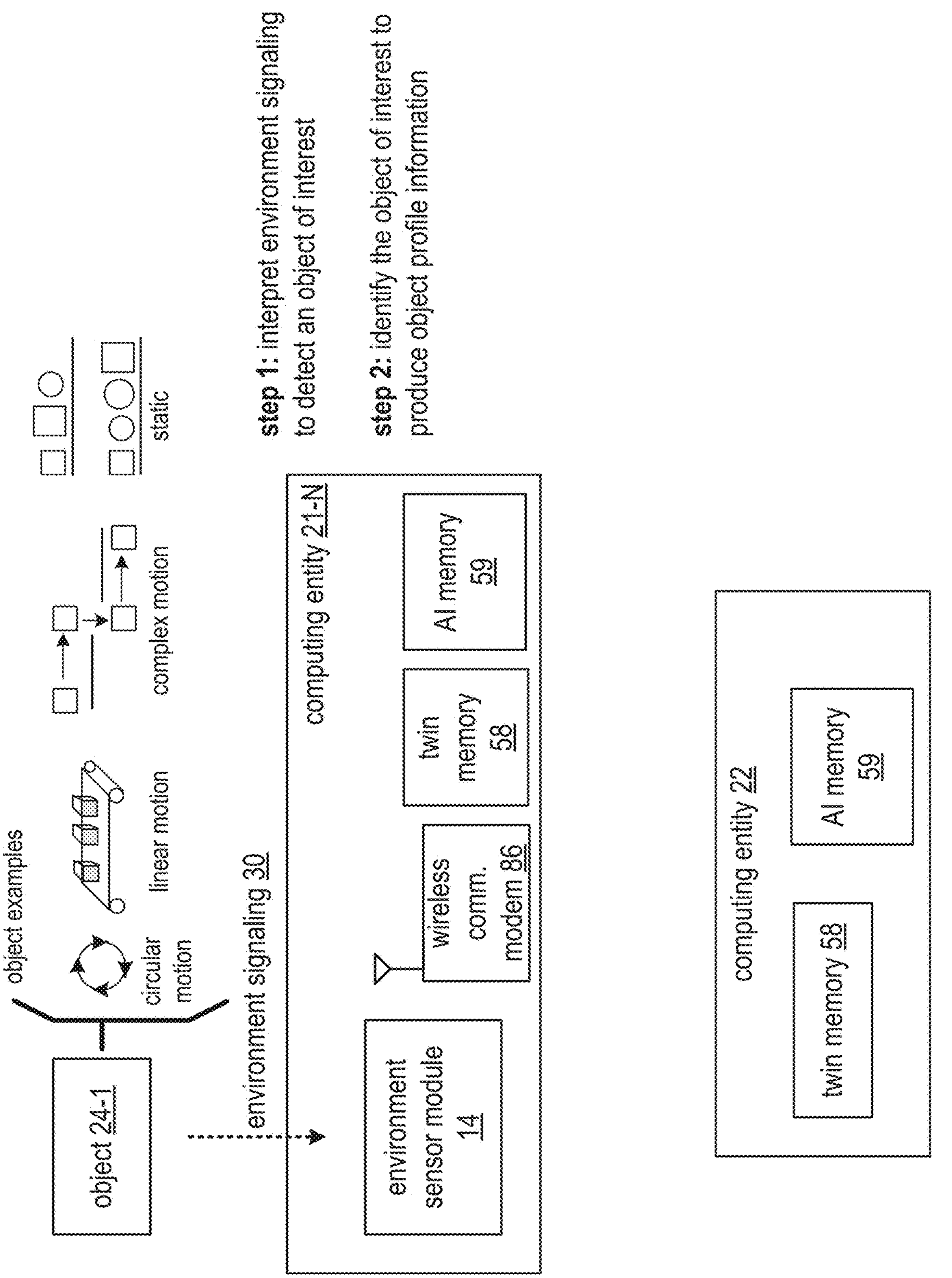
Figure 6B:
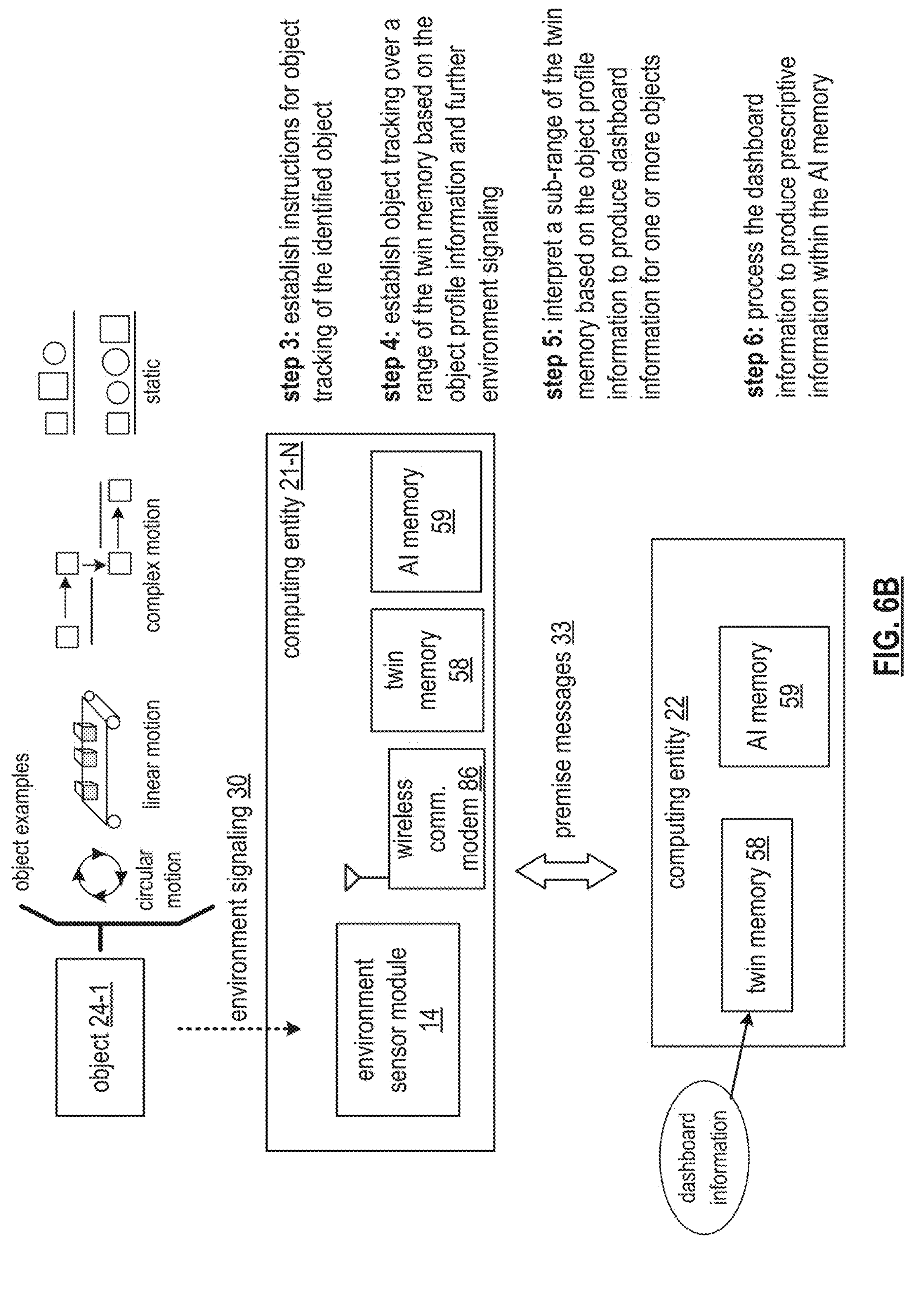
Figure 7A:
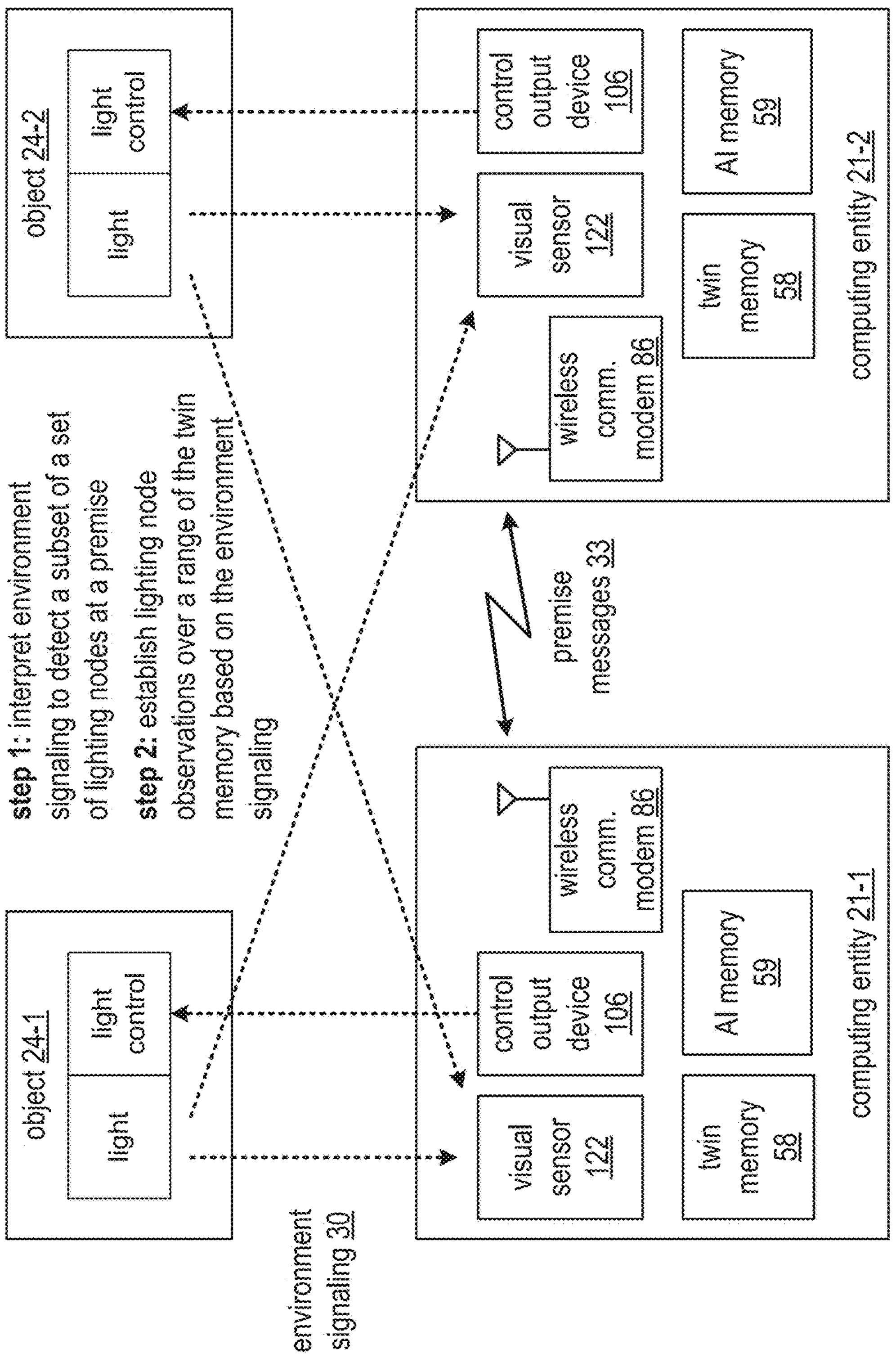
Figure 7B:
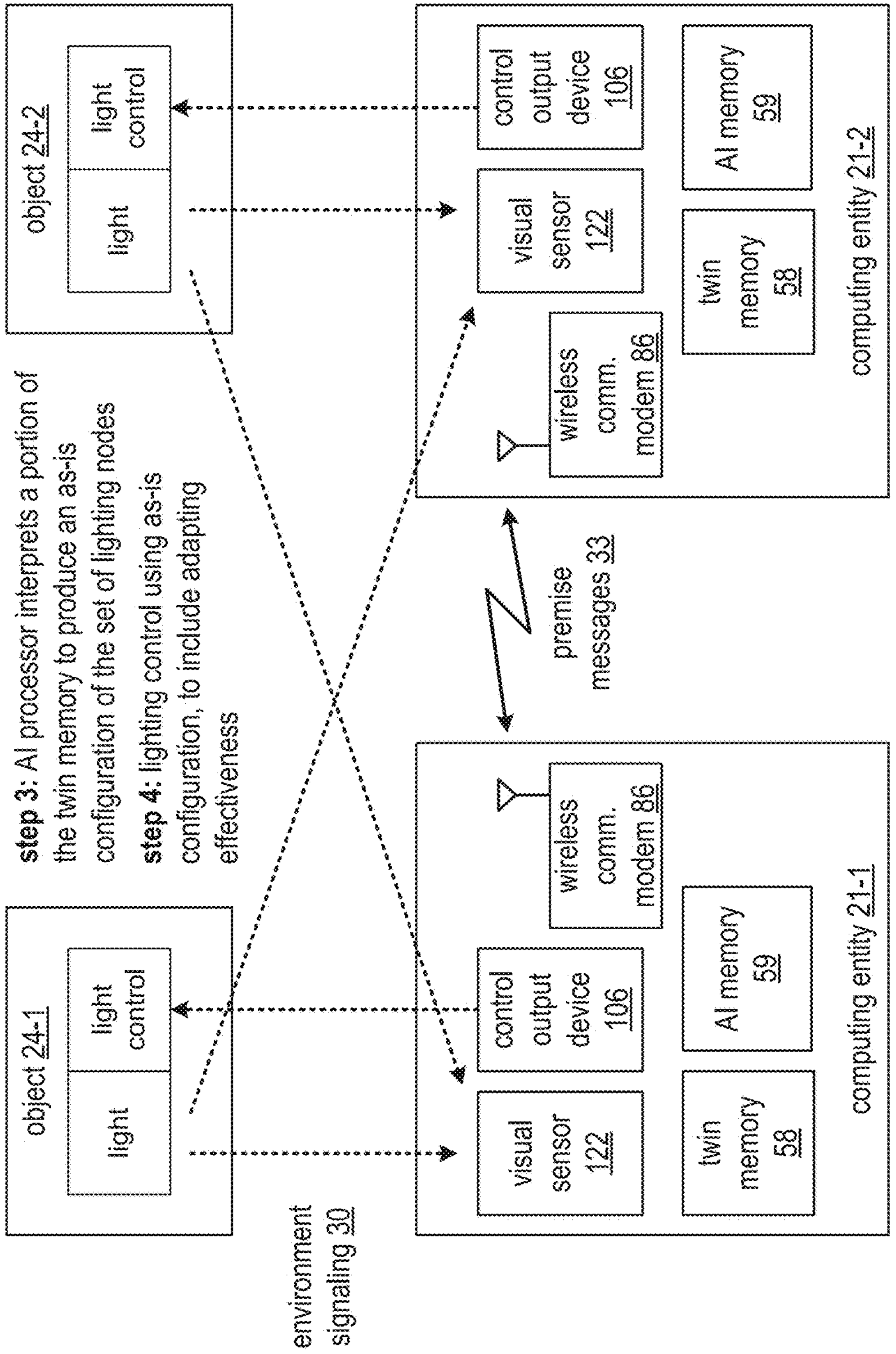

FIGS. 6A-6B are schematic block diagrams of another embodiment of a computing system illustrating an example of a self-forming communication and control system in accordance with the present invention; and FIGS. 7A-7B are schematic block diagrams of another embodiment of a computing system illustrating an example of a self-forming communication and control system in accordance with the present invention.

DETAILED DESCRIPTION OF THE INVENTION

Figure 1:
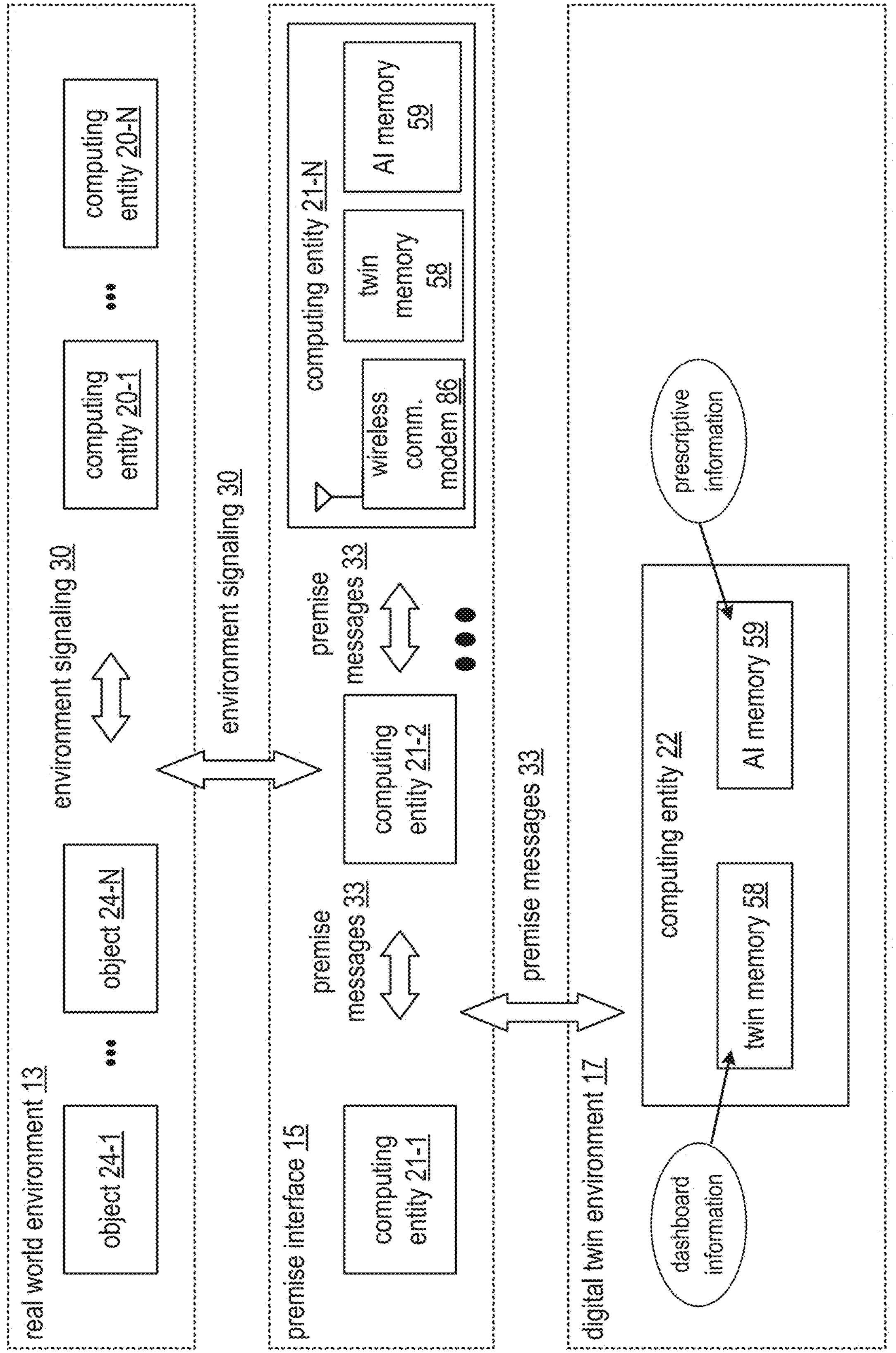
FIG. 1 is a schematic block diagram of an embodiment of a computing system in accordance with the present invention.

FIG. 1 is a schematic block diagram of an embodiment of a computing system that includes a real-world environment 13, a premise interface 15, and a digital twin environment 17. The real-world environment 13 includes objects 24-1 through 24-N and computing entities 20-1 through 20-N. The premise interface 15 includes computing entities 21-1 through 21-N. The digital twin environment 17 includes at least one computing entity 22.

The objects 24-1 through 24-N include anything physical and real. Examples of an object includes people, equipment, lights, lighting controllers, heating and air conditioning systems, building materials, furniture, personal items, tools, vehicles, manufacturing machines, storage systems, inventory handling equipment, retail inventory, industrial inventory, and anything else found in the real-world. The objects provide and accept environment signaling 30 to and from the premise interface 15.

The environment signaling 30 includes emission (e.g., direct such as from a light emitting diode (LED), or indirect such as a reflection from another source of emission) of all formats like sound, light, other wireless, solids, liquids, and gasses. Certain objects have control capabilities to accept the environment signaling 30 such as a lighting controller to receive and interpret commands from the premise interface 15 to turn on, turn off, or set an illumination level.

The environment signaling further more specifically includes at least one of an unencoded direct electromagnetic emission, an unencoded indirect electromagnetic emission, an encoded electromagnetic emission, an encoded electronic signal, an unencoded mechanical wave, and an encoded mechanical wave. The unencoded direct electromagnetic emission includes a light source or radio frequency carrier wave that is received substantially directly from the source without reflection. The unencoded indirect electromagnetic emission includes a light source or radio frequency carrier wave that is received substantially indirectly (e.g., reflected off another object between the source and the object) from the source without reflection. The encoded electromagnetic emission includes a light source or radio frequency carrier wave that is modulated with information and is received either directly or indirectly from the source (e.g., without or with reflection). The encoded electronic signal includes a signal on a wire that is modulated with information (e.g., an ethernet cable communication data packets). The unencoded mechanical wave includes a sound wave that is not modulated with information and is received either directly or indirectly from the source (e.g., without or with acoustic reflection). The encoded mechanical wave includes a sound wave that is modulated with information and is received either directly or indirectly from the source (e.g., without or with acoustic reflection).

The computing entities include various components as is further discussed with reference to FIGS. 2A, 2B, 3, and 4. For example, a typical computing entity includes a wireless communication modem 86 to communicate with other computing entities, a twin memory 58 to store executable software and parameters associated with providing of a digital twin representation of the objects 24-1 through 24-N, and an Artificial Intelligence (AI) memory 59 to store executable software and parameters associated with providing AI processing of the digital twin representation.

The computing entities 20-1 through 20-N of the real-world environment 13 are associated with the objects 24-1 through 24-N and are capable of exchanging the environment signaling 30 to and from the objects as well as with the premise interface 15. For example, the computing entity 20-1 gathers manufacturing operating data of a subset of objects when the computing entity 20-1 functions as a programmable logic controller (PLC) at a factory premise where the subset of objects includes factory implements. The computing entity 20-1 provides a representation of the manufacturing operating data as the environment signaling 30 to the premise interface 15. As another example, the computing entity 20-1 interprets commands for another subset of objects from further environment signaling 30 received from the premise interface 15 and issues more environment signaling 30 to some of the subset of objects that includes a representation of the commands.

The computing entities 21-1 through 21-N of the premise interface 15 are deployed around a premise that includes the real-world environment 13. In an embodiment, the computing entities 21-1 through 21-N form a mesh network where each computing entity of the premise interface 15 is a node of the mesh network to provide connectivity for essentially every object and computing entity of the real-world environment 13. For example, computing entity 21-1 and 21-2 establish a wireless link, via the wireless communication modems 86, with each other to convey premise messages 33 between them and the computing entity 21-2 establishes another wireless link to relay some of those premise messages 33 between the computing entity 21-2 and computing entity 21-N when a yet another wireless link can not be established directly between computing entity 21-1 and computing entity 21-N.

The premise messages 33 includes signaling to establish and maintain the mesh network and payload data associated with the environment signaling 30. The computing entities 21-1 through 21-N of the premise interface 15 further communicate premise messages 33 with the at least one computing entity 22 of the digital twin environment 17. For example, computing entity 21-2 communicates a representation of substantially all of the environment signaling 30 associated with the real-world environment 13 with the computing entity 22.

The computing entity 22 of the digital twin environment 17 functions to process premise messages 33 representing status and operations of the real-world environment 13 to produce dashboard information within the twin memory 58. The dashboard information includes a digital twin representative of the premise. For example, a set of files representing layout of the premise indicating near real time status and data associated with the objects 24-1 through 24-N. As another example, information from the premise summarized by computing entity 20-1 when the computing entity 20-1 serves as a factory PLC.

The computing entity 22 of the digital twin environment 17 further functions to process the dashboard information to produce prescriptive information within the AI memory 59. The prescriptive information includes one or more of an interpretation of a portion of the dashboard information (e.g., a summary), an evaluation of some of the dashboard information vs a standard (e.g., achieving goals), and advice and/or instructions (e.g., recommended or actual manual/automated actions) to cause change with regards to one or more of the objects in the real-world environment 13.

In an embodiment, one or more of the computing entities serve as an object authenticity computing entity (e.g., where tasks include authenticating validity and information with regards to an object or computing entity of the real-world environment 13). In an embodiment, any of the computing entities serve as blockchain nodes and/or as object ledger computing entities and/or object ledger computing devices of an object distributed ledger utilized to house and transfer data and information of the computing system via tokens in a trusted way with high levels of security. A technological improvement is provided over prior art communication and computing systems associated with data management since only the device possessing control over a token may modify the token as part of such a tightly integrated overall data management process. Only a present trusted device may pass the control to a next trusted device that is part of the overall data management process.

Figure 2A:
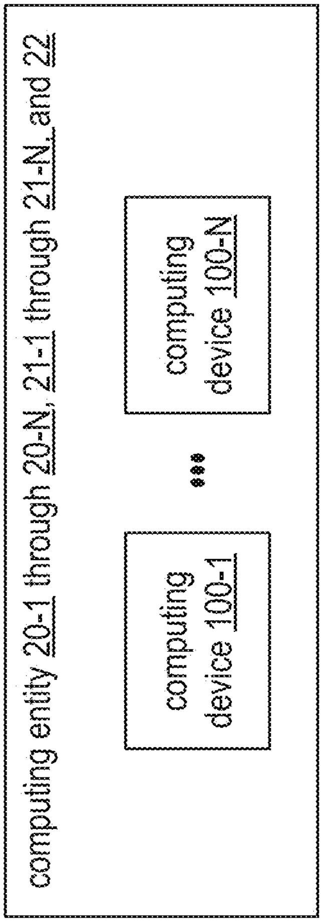
FIG. 2A is a schematic block diagram of an embodiment of a computing entity of a computing system in accordance with the present invention.

FIG. 2A is a schematic block diagram of an embodiment of the computing entity (e.g., 20-1 through 20-N; 21-1 through 21-N; and 22) of the computing system of FIG. 1. The computing entity includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a mesh network node device, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
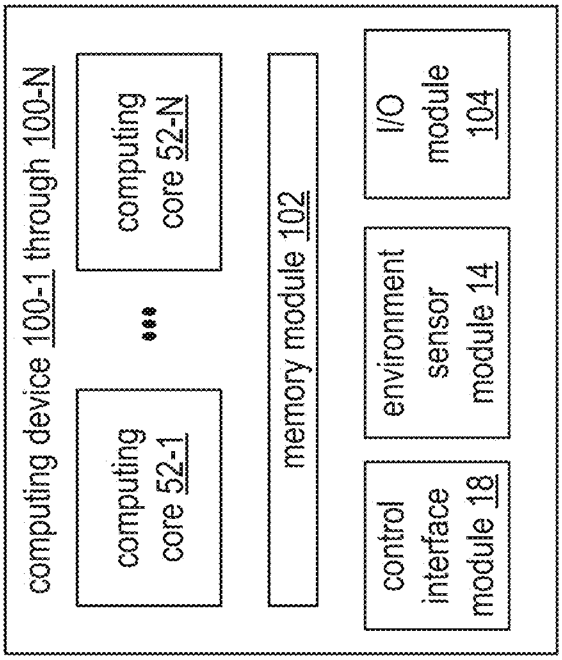
FIG. 2B is a schematic block diagram of an embodiment of a computing device of a computing system in accordance with the present invention.

FIG. 2B is a schematic block diagram of an embodiment of a computing device (e.g., 100-1 through 100-N) of the computing entity of FIG. 2A that includes one or more computing cores 52-1 through 52-N, a memory module 102, a control interface module 18, an environment sensor module 14, and an input/output (I/O) module 104. In alternative embodiments, the control interface module 18, the environment sensor module 14, the I/O module 104, and the memory module 102 may be standalone (e.g., external to the computing device). An embodiment of the computing device is discussed in greater detail with reference to FIG. 3.

Figure 3:
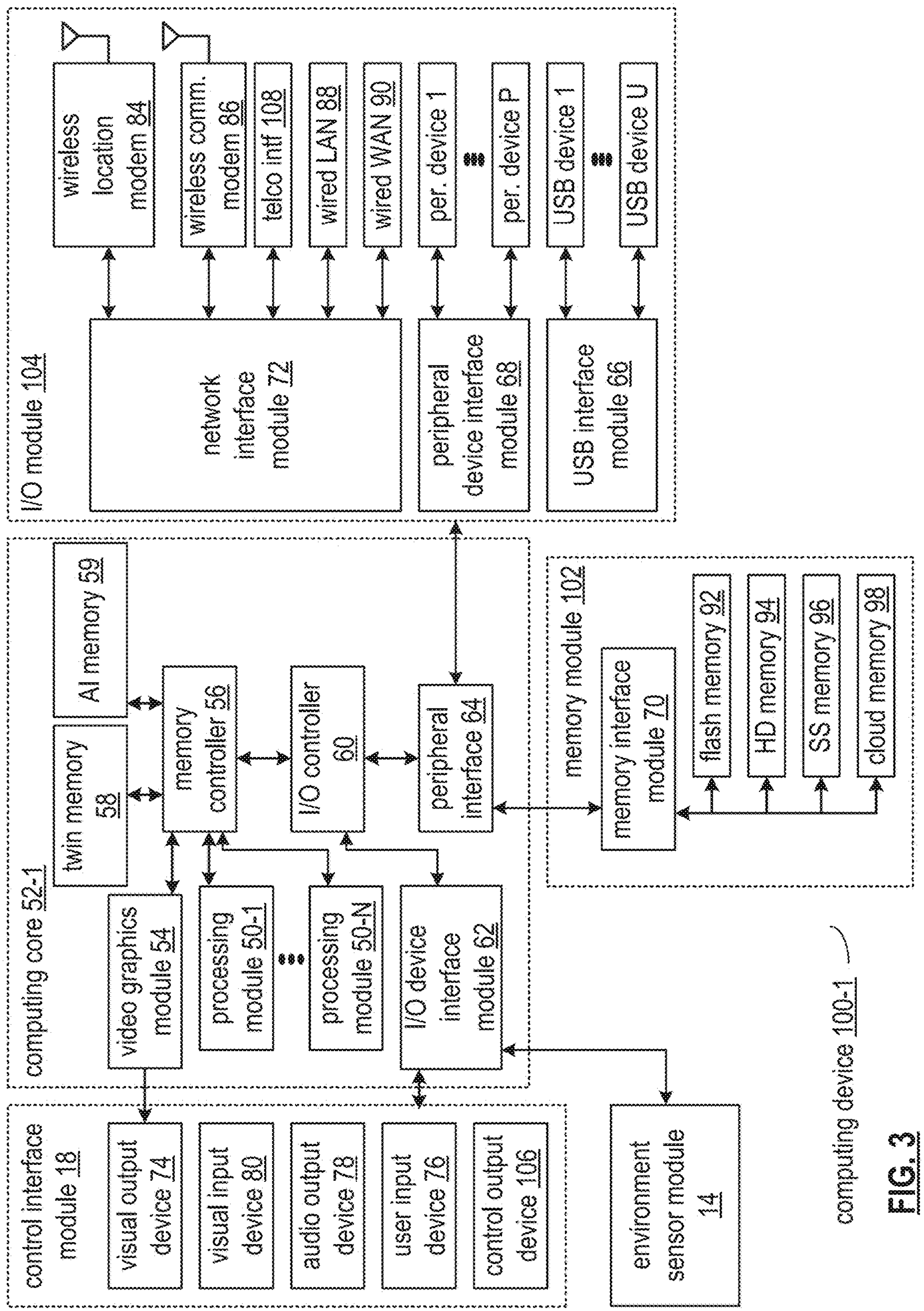
FIG. 3 is a schematic block diagram of another embodiment of a computing device of a computing system in accordance with the present invention.

FIG. 3 is a schematic block diagram of another embodiment of the computing device 100-1 of the computing system 10 that includes the control interface module 18, the environment sensor module 14, the computing core 52-1, the memory module 102, and the I/O module 104. The control interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, earphone, a motor, etc.). The control interface module 18 further includes one or more user input devices 76 (e.g., keypad, keyboard, touchscreen, voice to text, a push button, a microphone, a card reader, a door position switch, a biometric input device, etc.) and one or more control output devices 106 (e.g., lighting control, environmental control, servos, motors, lifts, pumps, actuators, and anything to control real-world object and devices).

The computing core 52-1 includes a video graphics module 54, one or more processing modules 50-1 through 50-N, a memory controller 56, one or more twin memories 58 and one or more AI memories 59 (e.g., RAM), one or more input/output (I/O) device interface modules 62, an input/output (I/O) controller 60, and a peripheral interface 64. A processing module is as defined at the end of the detailed description and includes a computing processor and an AI processor.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, a Wirepas meshing module, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100-1 may include more devices or fewer devices and modules than shown in this example embodiment.

Figure 4:
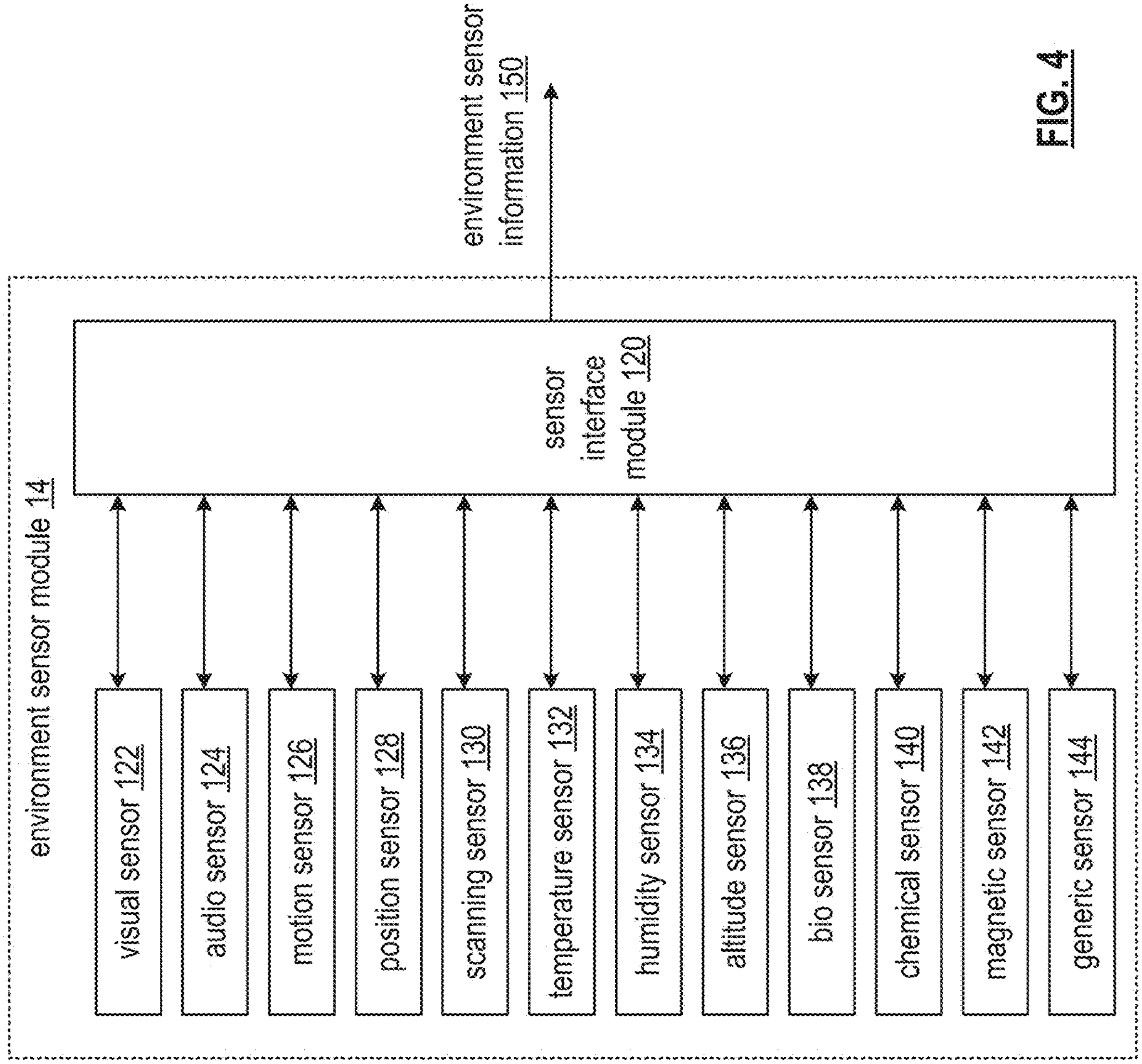
FIG. 4 is a schematic block diagram of an embodiment of an environment sensor module of a computing system in accordance with the present invention.

FIG. 4 is a schematic block diagram of an embodiment of the environment sensor module 14 of the computing device of FIG. 2B that includes a sensor interface module 120 to output environment sensor information 150 based on information communicated with a set of sensors. The set of sensors includes a visual sensor 122 (e.g., 2-D camera, 3-D camera, 360° view camera, a camera array, an optical spectrometer, a photocell, etc.) and an audio sensor 124 (e.g., a microphone, a microphone array, a vibration detector). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (moisture level detector, resistance based, capacitance based) and an altitude sensor 136 (e.g., pressure based, GPS-based, laser-based).

The set of sensors further includes a biosensor 138 (e.g., enzyme, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
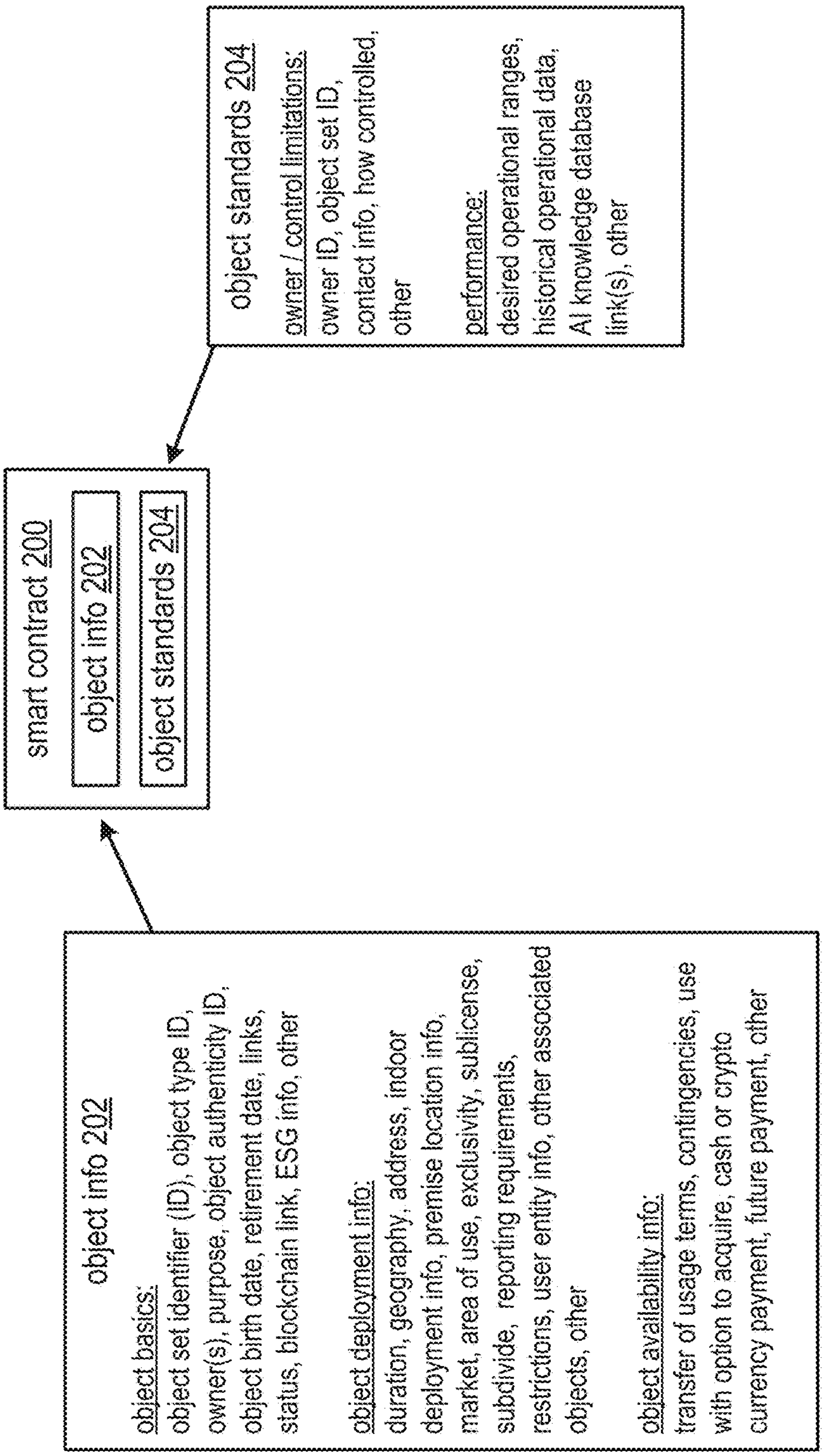
FIG. 5A is a schematic block diagram of a data structure for a smart contract in accordance with the present invention.

FIG. 5A is a schematic block diagram of a data structure for a smart contract 200 that includes object information 202 and object standards 204. The object information 202 includes object basics (e.g., including links to blockchains and electronic assets), object deployment information, and object availability information. FIG. 5A illustrates examples of each category of the object information 202. The object standards 204 includes owner information and performance associated with the smart contract. FIG. 5A further illustrates examples of each of the categories of the object standards 204. Further examples are referenced below.

Figure 5C:
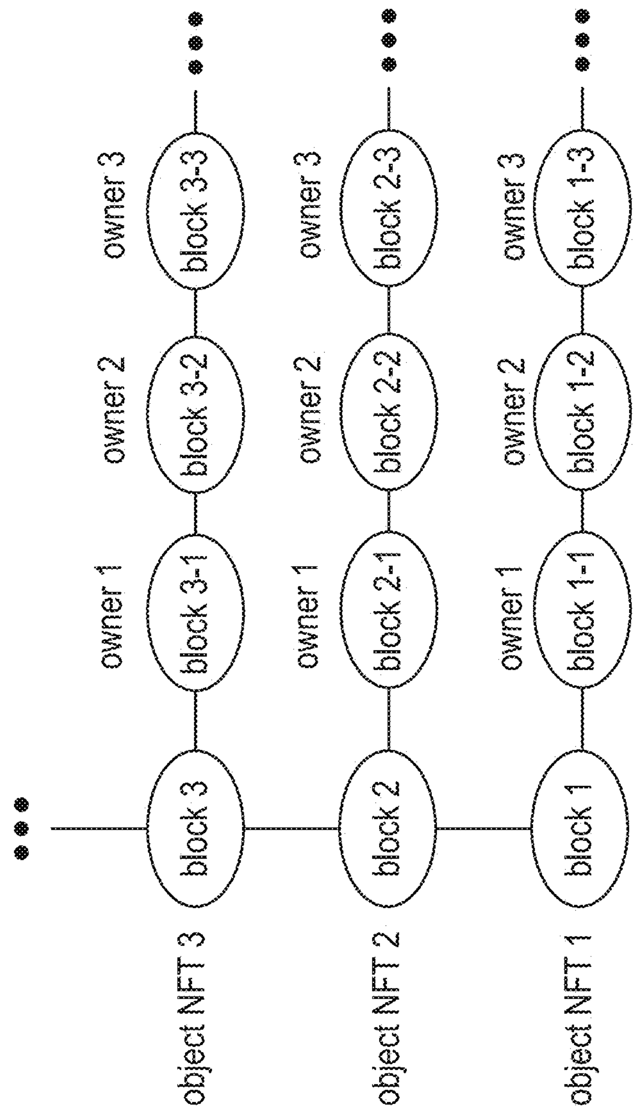
FIGS. 5B and 5C are schematic block diagrams of organization of object distributed ledgers in accordance with the present invention.
Figure 5B:
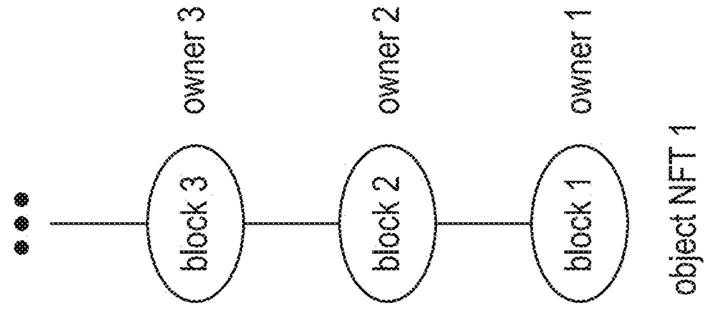

FIGS. 5B and 5C are schematic block diagrams of organization of object distributed ledgers. FIG. 5B illustrates an example where a single blockchain serves as the object distributed ledger linking a series of blocks of the blockchain, where each block is associated with a different owner (e.g., different owners over time for a particular object represented by a nonfungible token). FIG. 5C illustrates another example where a first blockchain links a series of blocks of different non-fungible tokens for different sets of objects. Each block forms a blockchain of its own where each further block (e.g., to the right) of its own is associated with a different owner over time for the set of objects associated with the non-fungible token.

Figure 5D:
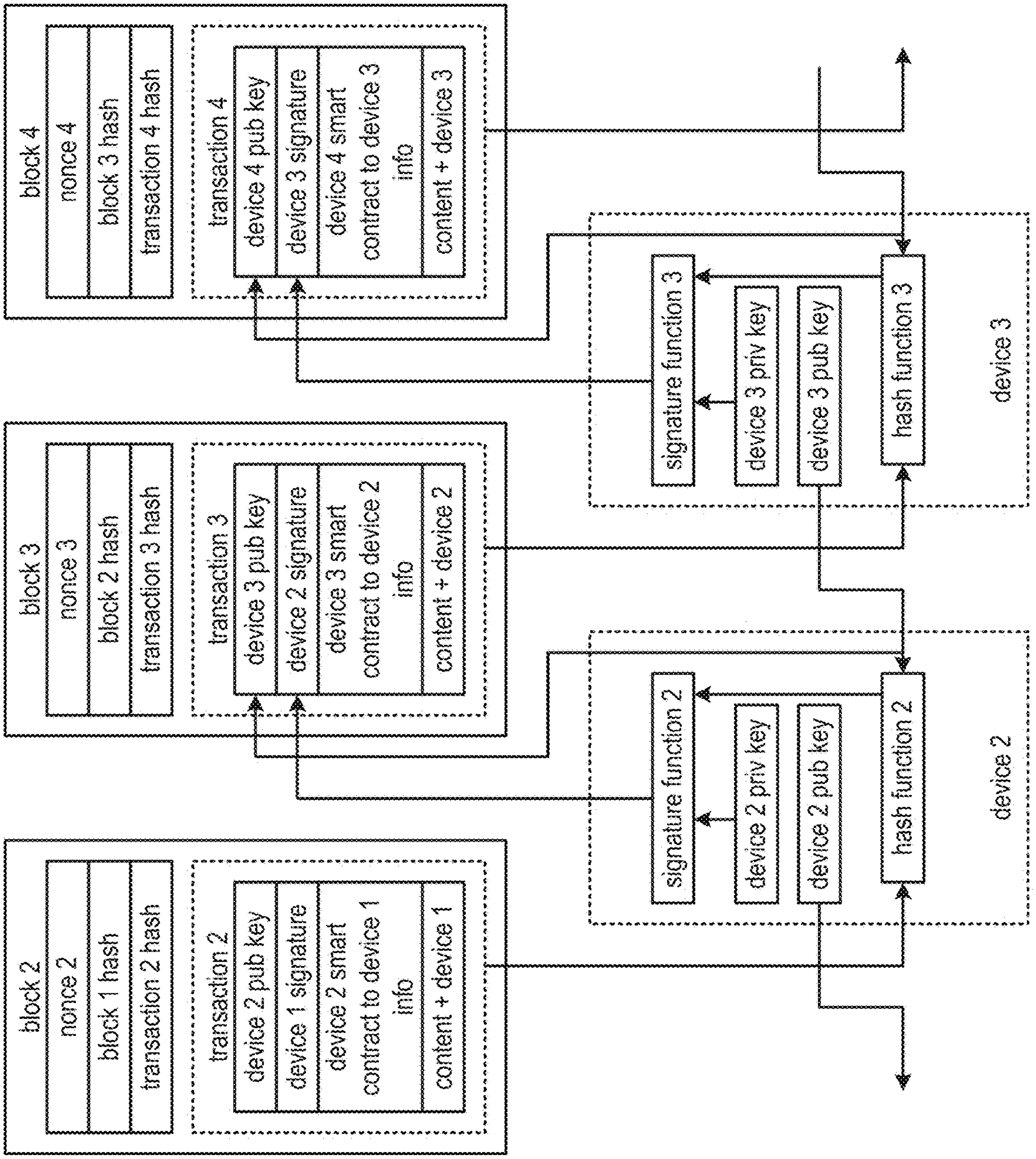
FIG. 5D is a schematic block diagram of an embodiment of a blockchain associated with an object distributed ledger in accordance with the present invention.

FIG. 5D is a schematic block diagram of an embodiment of a content blockchain of an object distributed ledger, where the content includes a smart contract to support operation of an object in the real-world environment and/or a meshing node in the premise interface. A securely passing process is utilized for secure passing of a token (e.g., a block, a smart contract, etc.) between a previous “owner” and a “new owner.” A technological improvement is provided over prior art communication and computing systems associated with data management since only a device possessing control over the token may modify the token as part of such a tightly integrated overall digital records process described in this section for the present invention. Only a present trusted device may pass the control to a next trusted device that is part of this records management process.

The computing system of FIG. 1 utilizes blockchain-encoded records to securely represent assets of the computing system. The assets include physical assets like any of the objects and computing devices and virtual assets like a model of a portion of the premise and a representation of a software process (e.g., an AI software module associated with optimizing operation of a bank of lighting controllers).

In an embodiment, a blockchain of the blockchain-encoded records is utilized to record steps of an asset lifecycle for an asset such as creation, initial and subsequent ownership (e.g., by a controlling entity), deployment, configuration, establishing trust, service-life utilization, and decommissioning. For instance, a new blockchain is created when a new computing system is deployed for a new premise to enjoy the benefits of a digital twin solution. A new block representing a new or transferred asset of the computing system is created by an associated computing entity on behalf of an initial owner. The blockchain is updated when the asset transitions through the lifecycle. The blockchain is updated when control (e.g., ownership) of the asset is changed.

The blockchain includes a plurality of blocks 2-4. Each block includes a header section and a transaction section. The header section includes one or more of a nonce, a hash of a preceding block of the blockchain, where the preceding block was under control of a preceding device (e.g., a real-world environment computing entity, a premise interface computing entity, a blockchain node computing device, a meshing node, the computing entity of the digital twin environment, etc.) in a chain of control of the blockchain, and a hash of a current block (e.g., a current transaction section), where the current block is under control of a current device in the chain of control of the blockchain.

The transaction section includes one or more of a public key of the current device, a signature of the preceding device, smart contract content, change of control from the preceding device to the current device, and content information from the previous block as received by the previous device plus content added by the previous device when transferring the current block to the current device.

FIG. 5D further includes computing devices 2-3 (e.g., devices #2 and #3) to facilitate illustration of generation of the blockchain. Each device includes a hash function, a signature function, and storage for a public/private key pair generated by the device.

In an example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 content request to 2 information, and the previous content plus content from device 2. The device 3 content request to device 2 information includes one or more of a detailed content request, a query request, background content, and specific instructions from device 3 to device 2 for access to an object. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining computing entity, of another computing device), generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash which is subsequently verified, and where the number of zeros is adapted for a subset of blocks).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted). A technological improvement is provided over prior art communication and computing systems associated with data management since only the device possessing control over a block may modify the block as part of such a tightly integrated overall data management process. Only a present trusted device may pass the control to a next trusted device that is part of the overall data management process. Only blocks with nonces of an expected number of zeros are trusted.

The method described above in conjunction with a processing module of any computing entity of the computing system can alternatively be performed by other specialty modules of the computing system of FIG. 1 or by other specialty devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system, cause one or more computing devices of the computing system to perform any or all of the method steps described above.

FIGS. 6A-6B are schematic block diagrams of another embodiment of a computing system illustrating an example of a self-forming communication and control system. The computing system includes the object 24-1 of FIG. 1, the computing entity 21-N of FIG. 1, and the computing entity 22 of FIG. 1. The object 24-1 includes a physical object such as material in a factory premise where the material includes one or more of factory machinery, work in progress, and finished goods of inventory. The factory includes production steps where the material is moving or in a static condition. When moving, the movement includes one or more of circular motion (e.g., a circular motion vector), linear motion (e.g., a uniform motion vector), and complex motion (e.g., varying vectors).

FIG. 6A illustrates an example of operation of a method for processing data of the self-forming communication and control system where a first step includes the processor of the computing entity 21-N executing environment interpretation software from a first memory causing the processor to detect object 24-1 of an environment based on environment signaling 30 of the environment to produce a detected object. The object includes at least one of a physical object and a virtual object. For example, the processor interprets environment signaling 30 from a visual sensor 122 of the environment sensor module 14 that reveals an image of object 24-1.

The detecting of the object includes a variety of sub-steps. A first sub-step includes the processor obtaining the environment signaling of the environment from an environment sensor module. For example, an image sensor of the environment sensor module 14 captures imagery of the object 24-1, such as widgets moving down a conveyor belt.

A second sub-step includes the processor indicating the physical object as the detected object when identifying a physical object pattern from at least one of an unencoded direct electromagnetic emission, an unencoded indirect electromagnetic emission, and an unencoded mechanical wave of the environment signaling. For example, the processor utilizes object image detecting software to detect the object 24-1 based on the image from the image sensor (e.g., unencoded direct electromagnetic emission such as light). The detecting includes at least one of detecting a specific object, object type, and an unknown object. The image detecting software further includes a variety of approaches including comparing pixels of the captured image to pixels of a stored image recovered from the twin memory 58. A second approach includes utilizing machine learning to detect the object when a likelihood of detection is greater than a threshold level when comparing the image from the image sensor to knowledge of the AI memory 59.

Alternatively, the second sub-step includes the processor indicating the virtual object as the detected object when identifying a virtual object pattern from at least one of an encoded electromagnetic emission, an encoded electronic signal, and an encoded mechanical wave of the environment signaling. For example, the processor interprets data from the wireless communication modem 86 that results from the wireless communication modem 86 receiving an encoded electronic admission (e.g., an encoded wireless signal from a device associated with the object 24-1). As another example, the process interprets the data from the network interface module 72 of FIG. 3 from the wired LAN 88 sourced by a device (e.g., a factory computer) associated with the object 24-1.

Having detected the object 24-1, a second step of the example method of operation includes the processor of the computing entity 21-N executing object identification software from a second memory to facilitate intercommunication between the environment interpretation software and the object identification software to produce an identified object and object profile information based on the detected object and an object knowledge database (e.g., the memory 58, the AI memory 59). The object profile information includes the object information 202 of FIG. 5A, and further includes object basics, object deployment information, and object availability information.

The producing of the identified object includes a series of sub-steps. A first sub-step includes the processor accessing a portion of the twin memory 58 (e.g., hereafter interchangeably referred to as twin memory or digital twin memory) that includes the object knowledgebase based on the detected object (e.g., utilizing identity of the detected object as an index into the knowledgebase). A second sub-step includes the processor comparing the detected object to the portion of the digital twin memory that includes the object knowledgebase to produce the identified object. For example, the processor compares the widget detected object to the portion of the twin memory and matches to a particular widget (e.g., a candy) as the identified object.

A third sub-step includes the processor accessing the portion of the digital twin memory that includes the object knowledgebase based on the detected object to produce the object profile information. For example, the processor accesses the twin memory 58 to retrieve the object profile information with regards to the particular widget. For instance, the object profile information includes parameters associated with the candy such as volume per unit of time ranges, weight ranges, size information, expected movement vector information while on the conveyor or other device within manufacturing, etc.

As another example, the processor sources the object profile information from the object knowledgebase based on one or more of the identified object and the environment signaling 30. The object knowledgebase within the AI memory 59 includes information stored as knowledge with regards to objects that is part of one or more AI computing entities. For example, the processor applies machine learning to the detected object while accessing the object knowledgebase stored in the AI memory 59 to produce the identified object. The processor indexes the twin memory 58 utilizing the identified object to recover the object profile information (e.g., retrieve, generate using a portion affiliated with the identified object of the object knowledgebase as new object profile information based on most recent observations).

FIG. 6B further illustrates the example of operation of the method for processing data of the self-forming communication and control system where a third step includes the processor of the computing entity 21-N executing instruction generation software for generating processor-executable instructions for use with the object profile information and further environment signaling to provide object tracking for the object 24-1. The instructions include object tracking of the identified object within the environment.

The generating of the instructions includes the processor executing the instruction generation software from a third memory to facilitate intercommunication between the object identification software and the instruction generation software to generate the processor-executable instructions for use with the object profile information and further environment signaling. The instructions pertain to object tracking of the identified object within the environment in a format ready to use by the processor such as one or more of track the circular motion, track the linear motion, track the complex motion, detect when a static object moves, count objects passing by, and count rotations of a part of a machine.

The generation of the instructions includes a series of sub-steps based on a variety of approaches. Example approaches include extracting instructions from the AI memory based on the object profile information, generating new instructions based on the object profile information and previous instructions from the AI memory for similar objects, and decoding the instructions from at least one of the environment signaling 30 and the premise messages 33.

A first sub-step of the generating of the instructions includes the processor determining tracking parameters of the object tracking of the identified object based on the object profile information. For example, establish instructions based on particular expected movements of the identified object. For instance, the processor extracts the tracking parameters from the object profile information for the identified object from the twin memory 58.

A second sub-step includes the processor determining signaling parameters of the further environment signaling based on the identified object. For example, establish what types of signaling to expect of the further environment signaling for the identified object by extracting the signaling parameters for the identified object from the twin memory 58. As another example, the processor utilizes generative AI and the knowledgebase of the AI memory 59 to predict what present and/or future types of signaling to expect of the further environment signaling for the identified object.

A third sub-step includes the processor generating the processor-executable instructions based on the tracking parameters and the signaling parameters to produce the processor-executable instructions to facilitate subsequent collection of the further environment signaling associated with the identified object to provide the object tracking of the identified object within the environment. For example, the processor utilizes generative AI and a processor instruction portion of the knowledgebase of the AI memory 59 to produce the processor-executable instructions for the particular tracking parameters and the particular signaling parameters expected for the identified object from the further environment signaling.

A fourth step of the example method of operation for the processing data of the self-forming communication and control system includes the processor executing object tracking software from a fourth memory to facilitate intercommunication between the instruction generation software and the object tracking software to store object tracking information for the identified object within the digital twin memory by applying the processor-executable instructions to the further environment signaling. The object tracking information includes historical documentation of motions of the object 24-1 such as number of revolutions per unit of time over an observation timeframe, a count of passing objects that are similar, a complex motion pattern, etc.

The storing of the object tracking information by applying the instructions to the further environment signaling includes a series of sub-steps. A first sub-step includes the processor obtaining the further environment signaling. For example, the processor collects further image output from the image sensor of the environment sensor module 14 in accordance with the signaling parameters and the processor-executable instructions.

A second sub-step includes the processor interpreting the further environment signaling utilizing the processor-executable instructions associated with the object tracking of the identified object to produce the object tracking information. For example, the processor identifies movement of the identified object and records the movement as movement vector information over a movement timeframe.

A third sub-step includes the processor storing the object tracking information in a portion of the digital twin memory associated with the identified object. For example, the processor stores the object tracking information in the twin memory 58 of the computing entity 21-N along with timestamp information, indexed by at least one of time, object type, object identifier (ID), premise ID, or any other feasible index to facilitate subsequent generation of dashboard information and more. As another example, the processor issues premise messages 33 to the computing entity 22, where the premise messages 33 includes the object tracking information for storage in the twin memory 58 of the computing entity 22.

Having produced and stored the object tracking information, a fifth step of the example method of operation includes the processor executing dashboard software from a fifth memory to facilitate intercommunication between the object tracking software and the dashboard software to interpret a portion of the object tracking information for the identified object from the digital twin memory to produce dashboard information. The dashboard information includes a representation of status of the identified object based on the further environment signaling and in accordance with the object profile information. Examples include graphical representations of an image of the object, the number of revolutions per unit of time over several observation timeframes, the counts of passing objects that are similar within another timeframe, the complex motion pattern, and any other representation of the real-world environment.

In the example, the processor of the computing entity 22 executes the dashboard software to carry out a series of sub-steps. Generally, subsequent steps may utilize the processor of the computing entity 21-N and/or the computing entity 22. In a first sub-step the processor of the computing entity 22 obtains the portion of the object tracking information that corresponds to the further environment signaling for the identified object from the digital twin memory (e.g., via the index for the identified object). In a second sub-step the processor interprets the portion of the object tracking information in accordance with the object profile information to produce the dashboard information. For example, the processor generates a tabular output indicating position information of the identified object over a series of time frames. As another example, the processor generates an animated representation of the identified object along with summary metrics indicating volume per unit of time for similar objects (e.g., pieces of candy moving down a conveyor belt or chute).

In another example, the processor selects a portion of the object tracking information based on detecting an anomaly and interpreting the selected portion of the object tracking information recovered from the twin memory 58 utilizing the object profile information (e.g., expected movement, graphic backgrounds, graphic foregrounds, etc.) to produce the dashboard information to bring attention to the anomaly. The processor stores the dashboard information in the digital twin memory 58 for subsequent utilization including providing a graphic output to a user interface output device, processing the dashboard information by an AI processor to provide a high level summary and/or to produce prescriptive information (e.g., corrective actions to abate the anomaly), and sending the dashboard information to another computing entity.

Having produced the dashboard information, a sixth step of the example method of operation includes the processor executing prescriptive software from a sixth memory to facilitate intercommunication between the dashboard software and the prescriptive software to process a portion of the dashboard information to produce prescriptive information within the artificial intelligence (AI) memory 59. The prescriptive information includes one or more of an interpretation of the portion of the dashboard information, an evaluation of the portion of the dashboard information against a standard, and adaptive processor-executable instructions for use with the object profile information and the further environment signaling to cause change with regards to the identified object within the environment.

The processing of the portion of the dashboard information to produce the prescriptive information includes a series of sub-steps. In a first sub-step the processor obtains the portion of the dashboard information corresponding to a prescriptive timeframe from the digital twin memory. For example, the processor accesses the twin memory 58 to obtain the portion of the dashboard information for a timeframe associated with the example anomaly.

In a second sub-step the processor processes the portion of the dashboard information in accordance with the object profile information to produce preliminary prescriptive information. The preliminary prescriptive information indicates issues, high level suggested actions, course corrections, etc. associated with the example anomaly. For example, the processor applies generative AI to the portion of the dashboard information in accordance with the object profile information to identify high level information and suggestions.

In a third sub-step the processor determines a format for the prescriptive information based on the preliminary prescriptive information and an object knowledgebase of the AI memory. For example, the processor applies the generative AI to the preliminary prescriptive information in accordance with the object profile information to obtain more the format that is more granular for the situation.

In a fourth sub-step the processor interprets the portion of the dashboard information in accordance with the format for the prescriptive information to produce the prescriptive information. For example, the processor once again utilizes the generative AI approach to process the portion of the dashboard information utilizing the format to produce the prescriptive information that carries a more targeted outcome. In a fifth sub-step the processor stores the prescriptive information within the AI memory 59 to facilitate even better future prescriptive information and to provide an output for the present system. A technological improvement is provided by the self-forming communication and control system such that subsequent monitoring by the premise interface 15 of FIG. 1 alone can suffice to abate issues (e.g., without processing at the digital twin environment 17 level) and provide summary information to the digital twin environment 17.

In an embodiment, the processor of the computing entity 22 issues further premise messages 33 to the computing entity 21-N (e.g., and others) to include the prescriptive information for storage in the AI memory 59 of the computing entity 21-N and others. In the embodiment, the computing entity 21-N issues environment signaling 30 to a device associated the object 24-1 to facilitate commands when the prescriptive information includes adaptations to abate issues and improve results.

The method described above in conjunction with a processing module of any computing entity of the computing system can alternatively be performed by other specialty modules of the computing system of FIG. 1 or by other specialty devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system, cause one or more computing devices of the computing system to perform any or all of the method steps described above.

FIGS. 7A-7B are schematic block diagrams of another embodiment of a computing system illustrating an example of a self-forming communication and control system. The computing system includes the object 24-1 of FIG. 1, the object 24-2 of FIG. 1, the computing entity 21-1 of FIG. 1, and the computing entity 21-2 of FIG. 1. The objects 24-1 and 24-2 each include a lighting controller with a unique lighting controller identifier (ID) and a light controlled by the lighting controller.

FIG. 7A illustrates an example of operation of a method for processing data of the self-forming communication and control system where a first step includes the processor of the computing entity 21-1 executing environment interpretation software from a first memory causing the processor to detect a set of lighting objects of an environment based on at least one of environment signaling 30 of the environment and premise messages 33 exchanged with another processor (e.g., of computing entity 21-2) to produce a set of detected lighting objects. Each lighting object of the set of lighting objects includes an illumination component (e.g., a set of lights) and a lighting control component (e.g., a lighting controller).

The detecting of the set of lighting objects includes a variety of sub-steps. A first sub-step includes the processor obtaining the environment signaling of the environment from an environment sensor module. For example, an image sensor of the environment sensor module 14 captures imagery of the object 24-1, such as a lighting fixture and/or light from a lighting fixture.

A second sub-step includes the processor indicating the physical object as the detected object when identifying a physical object pattern from at least one of an unencoded direct electromagnetic emission, an unencoded indirect electromagnetic emission, and an unencoded mechanical wave of the environment signaling. For example, the processor utilizes object image detecting software to detect the object 24-1 based on the image from the image sensor (e.g., unencoded direct electromagnetic emission such as light). The detecting includes at least one of detecting a specific object, object type, and an unknown object. The image detecting software further includes a variety of approaches including comparing pixels of the captured image to pixels of a stored image recovered from the twin memory 58. A second approach includes utilizing machine learning to detect the object when a likelihood of detection is greater than a threshold level when comparing the image from the image sensor to knowledge of the AI memory 59.

Alternatively, the second sub-step includes the processor indicating a virtual object as the detected object when identifying a virtual object pattern from at least one of an encoded electromagnetic emission, an encoded electronic signal, and an encoded mechanical wave of the environment signaling. For example, the processor interprets data from the wireless communication modem 86 that results from the wireless communication modem 86 receiving an encoded electronic admission (e.g., an encoded wireless signal from a light control associated with the object 24-1). As another example, the process interprets the data from the network interface module 72 of FIG. 3 from the wired LAN 88 sourced by a device (e.g., a light control) associated with the object 24-1.

As yet another example, the processor interprets output of visual sensor 122 that portrays unique patterns of light from lights within visual range of the visual sensor 122 (e.g., encoded unique identifier that correlates to identifier information of the premise messages 33, simple timed flash pattern, etc.) as the environment signaling 30 from each of objects 24-1 and 24-2 to detect the lighting objects. As a still further example, the processor interprets premise messages 33 via the wireless communication modem 86 to identify lighting controllers common to a premise as the set of detected lighting objects. Some lighting controllers may not be in visual range of the visual sensor 122 but nevertheless are detectable by way of interpreting the premise messages 33.

Having produced the set of detected lighting objects for the premise of the computing entity 21-1, a second step of the example method of operation includes the processor establishing lighting observations. The establishing includes a series of sub-steps. A first sub-step includes the processor executing instruction generation software from a second memory to facilitate intercommunication between the environment interpretation software and the instruction generation software to generate processor-executable instructions for use by the processor to subsequently monitor at least one of further environment signaling of the environment and further premise messages associated with the set of detected lighting objects. The instructions pertain to observing the lighting of the set of detected lighting objects within the environment in a format ready to use by the processor such as one or more of timestamping when, if possible, a particular light is on or off, when some light is on or off and what relative level of illumination.

The generation of the instructions includes a series of sub-steps. A first sub-step includes determining monitoring parameters for the processor to subsequently monitor the set of detected lighting objects based on the as-is configuration information. For example, utilizing an image sensor to look for illumination patterns. A second sub-step includes determining signaling parameters of the further environment signaling based on as-is configuration information. For example, determining which image sensors associated with which lighting objects to monitor other lighting objects that are within range to visually monitor in accordance with the as-is configuration information.

A third sub-step includes determining messaging parameters of the further premise messages based on the as-is configuration information. For example, determining formatting of expected further premise messages 33 between the set of lighting objects. A fourth sub-step includes generating the processor-executable instructions based on the monitoring parameters, the signaling parameters, and the messaging parameters to produce the processor-executable instructions to facilitate subsequent collection of the further environment signaling associated with the set of detected lighting objects. For example, pseudocode steps are generated based on the various parameters. As another example, actual executable software for the processor is generated based on the various parameters. Alternatively, or in addition to, the generation includes extracting instructions from the AI memory based on as-is configuration information for the set of detected lighting objects, generating new instructions based on the as-is configuration information and previous instructions from the AI memory for similar objects, and decoding the instructions from at least one of the environment signaling 30 and the premise messages 33.

A third step of the example of operation includes the processor executing object monitor software from a third memory to facilitate intercommunication between the instruction generation software and the object monitor software to store object monitor information for the set of detected lighting objects within a digital twin memory by applying the processor-executable instructions to the at least one of the further environment signaling of the environment and the further premise messages associated with the set of detected lighting objects. The object monitor information includes observations of the lights with regards to on/off times and the illumination levels in accordance with the instructions.

The obtaining and storing of the object monitor information includes a series of sub-steps. A first sub-step includes obtaining the further environment signaling over a pattern development timeframe. For example, the visual sensor 122 of the computing entity 21-1 monitors environment signaling 30 from the object 24-1 and the object 24-2 over the pattern development timeframe (e.g., 5 minutes to collect enough lighting samples to enable determining the as-is configuration information. A second sub-step includes obtaining the further premise messages over the pattern development timeframe. For example, the wireless communication modem 86 of the computing entity 21-1 monitors, for at least the pattern development timeframe, the further premise messages 33 from the computing entity 21-2 to produce the further premise messages.

A third sub-step includes interpreting the further environment signaling and the further premise messages utilizing the processor-executable instructions to produce the object monitor information. For example, a composite of the further environment signaling and the further premise messages produces the object monitor information. A fourth sub-step includes storing the object monitor information in a portion of the digital twin memory associated with the set of detected lighting objects. For example, the computing entity 21-1 stores the object monitor information in this twin memory 58, indexed by at least one of time, object type, object identifier (ID), premise ID, lights on/off, illumination levels, lighting types, lighting locations in the premise, or any other feasible index to facilitate subsequent generation of dashboard information and/or configuration information.

FIG. 7B further illustrates the example of operation of the method for processing data of the self-forming communication and control system where a fourth step includes the processor of the computing entity executing configuration software from a fourth memory to facilitate intercommunication between the object monitor software and the configuration software to generate should-be configuration information for the set of detected lighting objects to adapt an as-is configuration of the set of detected lighting objects to achieve an environment lighting requirement associated with one or more of a minimum illumination level, a maximum illumination level, and an energy efficiency level.

The should-be configuration information includes recommended spatial placement information for at least some of the set of detected lighting objects. As-is configuration information describes the as-is configuration to include current spatial placement information for at least some of the set of detected lighting objects. Subsequent implementation of the recommended spatial placement information facilitates subsequent instances of control include turning off unneeded lights, adjusting the illumination level to balance making operational and energy requirements, and even changing a lighting pattern randomly to affect mood. The generation of the should-be configuration information provides a technology improvement to facilitate achievement of the environment lighting requirement.

The processor facilitates the subsequent control utilizing a variety of approaches including selecting the portion of the as-is configuration information based on detecting a lighting anomaly and interpreting the selected portion of the as-is configuration information recovered from the twin memory 58 utilizing the as-is configuration information (e.g., what control aspects may abate the anomaly) to produce environment signaling 30 that includes a lighting command for a lighting controller. As another example, the processor issues premise message 33 to the computing entity 21-2 to facilitate the processor of computing entity 21-2 issuing environment signaling 33 to object 24-2 to control the light associated with object 24-2. As yet another example, the processor facilitates the control to shape a light pattern based on a user request. As a still further example, the processor facilitates the control to determine where a lighting object should be installed, moved, or decommissioned.

The processor executes configuration software from a fifth memory to facilitate intercommunication between the object monitor software and the configuration software to interpret a portion of the object monitor information for the set of detected lighting objects from the digital twin memory to produce the should-be configuration information for the set of detected lighting objects. The should-be configuration information includes recommended spatial placement information of at least some of the set of detected lighting objects, such as absolute locations in the premise and relative locations with reference to any other object or device in the premise. A technological improvement is also provided to auto-detect implementation of the should-be configuration information over manually entering the should-be configuration information.

Having produced the should-be configuration information, the processor executes lighting control software to facilitate intercommunication between the configuration software and the lighting control software to facilitate control of at least some of the set of detected lighting objects utilizing the should-be configuration information. The processor facilitates the control to achieve the environment lighting requirement.

The processor produces the as-is configuration information utilizing a series of sub-steps. A first sub-step includes determining a test pattern for the set of detected lighting objects. The test pattern includes an illumination and de-illumination sequence to discern spatial relationships between the set of detected lighting objects. For example, turning off the light next to another light to make sure that the two are especially next to each other.

A second sub-step includes facilitating initiation of the test pattern by the set of detected lighting objects for a testing timeframe. For example, the computing entity 21-1 utilizes the control output device 106 to send environmental signaling 30 that includes the test pattern to the lake control of the objects 24-1 and 24-2.

A third sub-step includes interpreting the portion of the object monitor information for the set of detected lighting objects from the digital twin memory that corresponds to the testing timeframe to produce the spatial placement information. For example, inferring the spatial placement information based on lighting patterns initiated and received as indicated by the object monitor information.

Alternatively, or in addition to, another approach includes selecting a portion of the object monitor information based on detecting a lighting anomaly (e.g., error, user input, improper illumination, etc.) and interpreting the selected portion of the object monitor information recovered from the twin memory 58 utilizing the as-is configuration information (e.g., typical lighting deployments, etc.) to produce the as-is configuration information. The processor stores the as-is configuration information in the digital twin memory 58 for subsequent utilization including providing a graphic output to a user interface output device, processing the as-is configuration information by an AI processor to provide a high level summary and/or to produce prescriptive information (e.g., general lighting control, corrective actions to abate the anomaly), and sending the as-is configuration information to another computing entity.

A fifth step of the example method of operation includes the computing entity 21-1 executing dashboard software from a sixth memory to facilitate intercommunication between the object monitor software and the dashboard software to interpret a portion of the object monitor information for the set of detected lighting objects from the digital twin memory to produce dashboard information in accordance with the as-is configuration information. The dashboard information comprising a representation of status of the set of detected lighting objects based on the at least one of the further environment signaling of the environment and the further premise messages associated with the set of detected lighting.

The producing of the dashboard information includes a series of sub-steps. A first sub-step includes obtaining the portion of the object monitor information that corresponds to the further environment signaling for the set of detected lighting objects from the digital twin memory. For example, the computing entity 21-1 extracts the object monitor information from the twin memory 58. A second sub-step includes interpreting the portion of the object monitor information in accordance with the as-is configuration information to produce the dashboard information. For example, a graphic is rendered to represent the spatial placement information of the set of detected lighting objects along with a representation of an illumination level (e.g., real-time or historical based on a desired time frame). As another example, the graphic is further rendered to indicate areas of concern such as poor illumination, no illumination, requested but unfulfilled illumination, unrequested over illumination, and any other anomaly of concern.

Having produced the as-is configuration information, a sixth step of the example method operation includes the processor executing prescriptive software from a seventh memory to facilitate intercommunication between the dashboard software and the prescriptive software to process a portion of the dashboard information to produce prescriptive information within an artificial intelligence (AI) memory. The prescriptive information comprising one or more of an interpretation of the portion of the dashboard information, an evaluation of the portion of the dashboard information against a standard, and adaptive processor-executable instructions for use with the as-is configuration information and the further environment signaling to cause the processor to generate the should-be configuration information for the at least some of the set of detected lighting objects to adapt the as-is configuration of the set of detected lighting objects to achieve the environment lighting requirement. The standard associated with environment lighting requirements associated with one or more of a minimum illumination level, a maximum illumination level, and an energy efficiency level.

The executing the prescriptive software from the seventh memory includes a series of sub-steps. A first sub-step includes obtaining the portion of the dashboard information corresponding to a prescriptive timeframe from the digital twin memory. For example, the computing entity 21-1 recovers a portion of the dashboard information from the twin memory 58 for a time frame of the last 30 minutes.

A second sub-step includes the processing the portion of the dashboard information in accordance with the as-is configuration information to produce preliminary prescriptive information. For example, the portion of the dashboard information is compared to expected operational results based on the as-is configuration information.

A third sub-step includes determining a format for the prescriptive information based on the preliminary prescriptive information and an object knowledgebase of the AI memory 59. For example, the prescriptive information indicates to add additional lighting fixtures when the format includes enablement of adding more lighting fixtures. As another example, the prescriptive information indicates to change the lighting pattern for existing lighting when the format includes utilizing existing resources in a more optimal fashion to save on energy costs.

A fourth sub-step includes interpreting the portion of the dashboard information in accordance with the format for the prescriptive information to produce the prescriptive information. For example, generating instructions with regards to the adding more lighting fixtures. As another example of facilitating control of the existing set of detected lighting objects to optimize energy efficiency. A fifth sub-step includes storing the prescriptive information within the AI memory 59. For example, the computing entity 21-1 stores the prescriptive information within the AI memory 59 of the computing entity 21-1 and issues the prescriptive information via a premise message 33 to the computing entity 21-2 to facilitate storage of the prescriptive information in the AI memory 59 of the computing entity 21-2.

The method described above in conjunction with a processing module of any computing entity of the computing system can alternatively be performed by other specialty modules of the computing system of FIG. 1 or by other specialty devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system, cause one or more computing devices of the computing system to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, artificial intelligence (AI) processor, c), microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a “start” and/or “continue” indication. The “start” and “continue” indications reflect that the steps presented can optionally be incorporated in or otherwise used in conjunction with one or more other routines. In addition, a flow diagram may include an “end” and/or “continue” indication. The “end” and/or “continue” indications reflect that the steps presented can end as described and shown or optionally be incorporated in or otherwise used in conjunction with one or more other routines. In this context, “start” indicates the beginning of the first step presented and may be preceded by other activities not specifically shown. Further, the “continue” indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term “module” is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computerized method for processing data of a self-forming communication and control system, the method comprising:

executing, by a processor, object monitor software from a first memory to causing the processor to store object monitor information for a set of detected lighting objects within a digital twin memory by applying processor-executable instructions to at least one of environment signaling of an environment and premise messages associated with the set of detected lighting objects, wherein each lighting object of the set of detected lighting objects includes an illumination component and a lighting control component, the environment signaling comprising at least one of an unencoded direct electromagnetic emission, an unencoded indirect electromagnetic emission, an encoded electromagnetic emission, an encoded electronic signal, an unencoded mechanical wave, and an encoded mechanical wave;

executing, by the processor, configuration software from a second memory to facilitate intercommunication between the object monitor software and the configuration software to interpret a portion of the object monitor information for the set of detected lighting objects from the digital twin memory to generate should-be configuration information for the set of detected lighting objects to adapt as-is configuration information of the set of detected lighting objects to achieve an environment lighting requirement associated with one or more of a minimum illumination level, a maximum illumination level, and an energy efficiency level, wherein the should-be configuration information includes recommended spatial placement information for at least some of the set of detected lighting objects, wherein the as-is configuration information includes current spatial placement information for at least some of the set of detected lighting objects; and executing, by the processor, lighting control software from a third memory to facilitate intercommunication between the configuration software and the lighting control software to facilitate control of at least some of the set of detected lighting objects utilizing the should-be configuration information, wherein the processor facilitates the control to achieve the environment lighting requirement.

2. The method of claim 1 further comprising:

executing, by the processor, the configuration software from the second memory to facilitate intercommunication between the object monitor software and the configuration software to interpret a portion of the object monitor information for the set of detected lighting objects from the digital twin memory to produce the as-is configuration information for the set of detected lighting objects.

3. The method of claim 2, wherein the processor further executes the configuration software from the second memory to interpret the portion of the object monitor information for the set of detected lighting objects from the digital twin memory to produce the as-is configuration information for the set of detected lighting objects by:

determining a test pattern for the set of detected lighting objects, wherein the test pattern includes an illumination and de-illumination sequence to discern spatial relationships between the set of detected lighting objects;

facilitating initiation of the test pattern by the set of detected lighting objects for a testing timeframe; and interpreting the portion of the object monitor information for the set of detected lighting objects from the digital twin memory that corresponds to the testing timeframe to produce the spatial placement information.

4. The method of claim 1 further comprising:

executing, by the processor, dashboard software from a fourth memory to facilitate intercommunication between the object monitor software and the dashboard software to interpret a portion of the object monitor information for the set of detected lighting objects from the digital twin memory to produce dashboard information in accordance with the as-is configuration information, the dashboard information comprising a representation of status of the set of detected lighting objects based on the at least one of further environment signaling of the environment and further premise messages associated with the set of detected lighting.

5. The method of claim 4 further comprising:

executing, by the processor, the dashboard software from the fourth memory to:

obtain the portion of the object monitor information that corresponds to the further environment signaling for the set of detected lighting objects from the digital twin memory, and interpret the portion of the object monitor information in accordance with the as-is configuration information to produce the dashboard information.

6. The method of claim 4 further comprising:

executing, by the processor, prescriptive software from a fifth memory to facilitate intercommunication between the dashboard software and the prescriptive software to process a portion of the dashboard information to produce prescriptive information within an artificial intelligence (AI) memory, the prescriptive information comprising one or more of an interpretation of the portion of the dashboard information, an evaluation of the portion of the dashboard information against a standard associated with the environment lighting requirement, and adaptive processor-executable instructions for use with the as-is configuration information and the further environment signaling to cause the processor to generate the should-be configuration information for the set of detected lighting objects to adapt the as-is configuration information of the set of detected lighting objects to achieve the environment lighting requirement.

7. The method of claim 6 further comprising:

executing, by the processor, the prescriptive software from the fifth memory to:

obtain the portion of the dashboard information corresponding to a prescriptive timeframe from the digital twin memory, process the portion of the dashboard information in accordance with the as-is configuration information to produce preliminary prescriptive information, determine a format for the prescriptive information based on the preliminary prescriptive information and an object knowledgebase of the AI memory, interpret the portion of the dashboard information in accordance with the format for the prescriptive information to produce the prescriptive information, and store the prescriptive information within the AI memory.

8. The method of claim 1 further comprising:

executing, by the processor, the object monitor software from the first memory to:

generate the processor-executable instructions for use by the processor to subsequently monitor the at least one of the environment signaling of the environment and the premise messages associated with the set of detected lighting objects by:

determining monitoring parameters for the processor to subsequently monitor the set of detected lighting objects based on the as-is configuration information;

determining signaling parameters of the environment signaling based on the as-is configuration information;

determining messaging parameters of the premise messages based on the as-is configuration information; and generating the processor-executable instructions based on the monitoring parameters, the signaling parameters, and the messaging parameters to produce the processor-executable instructions to facilitate subsequent collection of the environment signaling associated with the set of detected lighting objects.

9. The method of claim 1, wherein the processor further executes the object monitor software from the first memory to store the object monitor information for the set of detected lighting objects within the digital twin memory by applying the processor-executable instructions to at least one of the environment signaling of the environment and the premise messages associated with the set of detected lighting objects by:

obtaining the environment signaling over a pattern development timeframe;

obtaining the premise messages over the pattern development timeframe;

interpreting the environment signaling and the premise messages utilizing the processor-executable instructions to produce the object monitor information; and storing the object monitor information in a portion of the digital twin memory associated with the set of detected lighting objects.

* * * * *